(12) United States Patent
Shatzkamer et al.

(10) Patent No.: US 8,769,629 B2
(45) Date of Patent: *Jul. 1, 2014

(54) USER SENSITIVE FILTERING OF NETWORK APPLICATION LAYER

(75) Inventors: Kevin Shatzkamer, San Francicso, CA (US); Christopher C. O'Rourke, Apex, NC (US); Richard Alan Galatioto, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 13/466,105

(22) Filed: May 7, 2012

(65) Prior Publication Data

US 2012/0227093 A1 Sep. 6, 2012

Related U.S. Application Data

(63) Continuation of application No. 11/747,186, filed on May 10, 2007, now Pat. No. 8,205,246.

(51) Int. Cl.
*H04L 29/06* (2006.01)

(52) U.S. Cl.
CPC ............ *H04L 63/0236* (2013.01); *H04L 63/20* (2013.01)
USPC ........ 726/4; 726/27; 726/28; 726/29; 726/30; 713/153; 713/154; 713/155

(58) Field of Classification Search
CPC ............................ H04L 63/0236; H04L 63/20
USPC ............................................................ 726/4
See application file for complete search history.

(56) References Cited

U.S. PATENT DOCUMENTS

| | | | | |
|---|---|---|---|---|
| 5,638,448 | A * | 6/1997 | Nguyen | 380/29 |
| 7,181,513 | B1 * | 2/2007 | Harada et al. | 709/223 |
| 8,205,246 | B2 * | 6/2012 | Shatzkamer et al. | 726/4 |
| 2008/0250484 | A1 * | 10/2008 | Chong et al. | 726/7 |
| 2008/0279200 | A1 | 11/2008 | Shatzkamer et al. | |

* cited by examiner

*Primary Examiner* — Longbit Chai
(74) *Attorney, Agent, or Firm* — Patent Capital Group (57) ABSTRACT

In one embodiment, a method includes receiving authorization data at a local node of a network. The authorization data indicates a particular network address of a different node in the network and an authenticated user ID of a user of the different node. Resource profile data is retrieved based on the user ID. The resource profile data indicates all application layer resources on the network that the user is allowed to access. The particular network address is associated at the local node with the resource profile data for the user. A request from the particular network address for a requested application layer resource on the network is blocked based on the resource profile data associated with the particular network address.

20 Claims, 6 Drawing Sheets

USER SENSITIVE FILTERING OF NETWORK APPLICATION LAYER

RELATED APPLICATION

This application is a continuation (and claims the benefit of priority under 35 U.S.C. §120) of U.S. application Ser. No. 11/747,186, filed May 10, 2007 now U.S. Pat. No. 8,205,246, entitled "USER SENSITIVE FILTERING OF NETWORK APPLICATION LAYER RESOURCES," Inventor(s) Kevin Shatzkamer, et al. The disclosure of the prior application is considered part of (and is incorporated by reference in) the disclosure of this application.

BACKGROUND OF THE INVENTION

1. Field of the Invention

The present invention relates to filtering of network application layer resources, such as a resource identified by a Uniform Resource Identifier (URI).

2. Description of the Related Art

Networks of general purpose computer systems and specialized devices connected by external communication links are well known and widely used in commerce. The networks often include one or more network devices that facilitate the passage of information between the computer systems and devices. A network node is a network device or computer or specialized device connected by the communication links. An end node is a node that is configured to originate or terminate communications over the network. An intermediate network node facilitates the passage of data between end nodes.

Application layer network resources are data and services available at end nodes and are typically identified for public access using a universal resource identifier (URI). URIs are described at the time of this writing in URIs, URLs, and URNs: Clarifications and Recommendations 1.0, W3C Note, Sep. 21, 2001. This reference is available on the Internet in a URI that indicates file uri-clarification in directory /TR/ at World Wide Web domain w3.org.

Authorities often limit the URIs that may be accessed from network nodes under their administration. For example, parents limit the URIs that their home computers can access to protect their children. Similarly, employers may limit the URIs that can be accessed from the enterprise networks used by their employees. However, current mechanisms to limit URI access are associated with the networks or end nodes of users and not the users themselves. Thus multiple users that use the same end node or enterprise network are often equally restricted from the same URIs.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Techniques are described for user-sensitive filtering of application layer resources. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Illustrated embodiments of the invention are described below in the context of an enterprise network connected to the public Internet through a service gateway router that enforces user-sensitive filtering of application layer resources that are identified by URIs. However, the invention is not limited to his context. In other embodiments, the same or other sub-networks access the same or other large networks with multiple application layer resources identified by the same or different identifiers using the same or different intermediate network nodes through which user authentication requests pass.

1.0 Overview

In one set of embodiments, a method includes receiving authorization data at a local node of a network. The authorization data indicates a particular network address of a different node in the network and an authenticated user identifier (ID) of a user of the different node. Resource profile data for the user is retrieved at the local node based on the user ID. The resource profile data indicates all application layer resources on the network that the user is allowed to access. The particular network address is associated at the local node with the resource profile data for the user. A request from the particular network address for a requested application layer resource on the network is blocked based on the resource profile data associated with the particular network address.

In other sets of embodiments, an apparatus or computer readable media are configured to perform one or more steps of the above method.

2.0 Network Overview

Communications between network nodes are typically effected by exchanging discrete packets of data. Information is exchanged within data packets according to one or more of many well known, new or still developing protocols. In this context, a protocol consists of a set of rules defining how the nodes interact with each other based on information sent over the communication links. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different layer of detail for information exchange. The header for a particular protocol typically indicates a type for the next protocol contained in its payload. The usually higher layer protocol in the payload is said to be encapsulated in the lower layer protocol in the header. The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

The data-link header provides information defining a particular communication link between one network node and an adjacent node. The internetwork header provides information defining the source and destination address within the computer network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header. After each hop, the source or destination addresses in the packet's data-link header may be updated, as necessary. However, the source and destination IP addresses typically remain unchanged as the packet is transferred from link to link in the network. The IP payload often includes data for an application (layer 7 header and payload).

Routers and switches are network devices that determine which communication link or links to employ to support the progress of data packets through the network. A network node that determines which links to employ based on information in the internetwork header (layer 3) is called a router.

The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple servers on multiple hosts (sometimes called tiers) for reasons that include reliability, scalability, and redundancy, but not limited to those reasons.

Figure 1A:
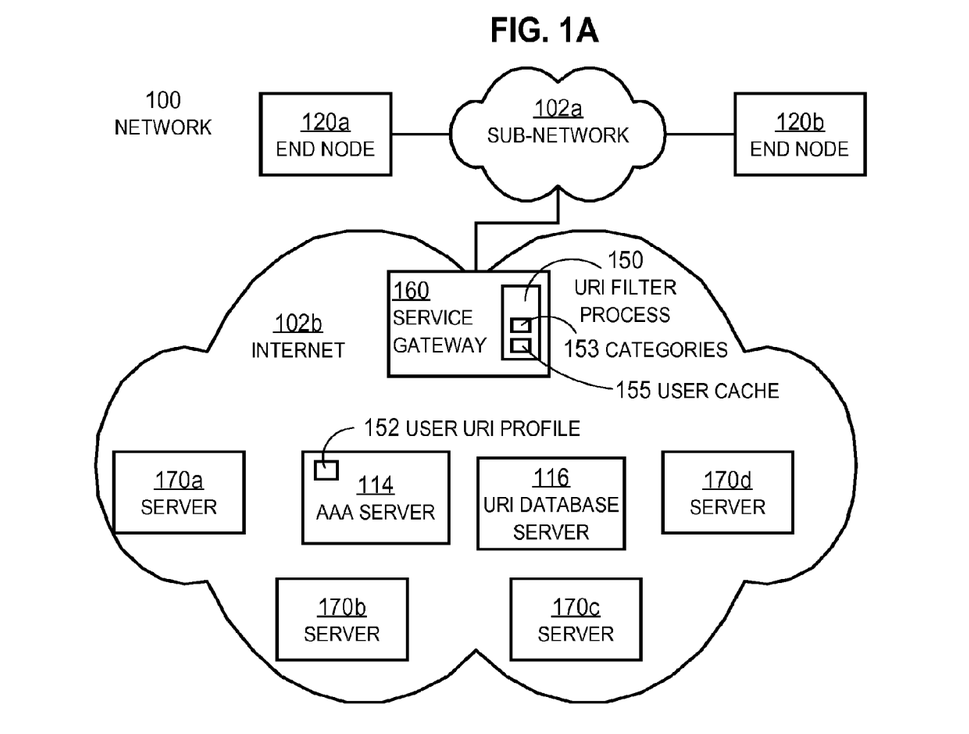
FIG. 1A illustrates a first example network.

FIG. 1 illustrates an example network 100. Network 100 includes sub-network 102a and an Internet 102b. End node 120a and end node 120b (collectively referenced hereinafter as end nodes 120) are connected to sub-network 102a. In some embodiments, sub-network 102a is a wireless access network. In some embodiments sub-network 102a is a wired access network, such as a cable network to individual residences and offices, often also called a last mile network segment. In some embodiments, sub-network 102a is an enterprise network. The Internet 102b is any collection of one or more networks to which sub-network 102a is connected. In some embodiments, the Internet 102b is the public Internet, well known and widely used in commerce. A user of client process (not shown) on an end node 120 requests resources available on Internet 102b.

Internet 102b includes service gateway 160, an authentication, authorization and accounting (AAA) server 114, a URI database server 116, and one or more other servers, including server 170a, server 170b, server 170c, server 170d (collectively referenced hereinafter as servers 170). One or more intermediate nodes on sub-network 102a are connected directly as shown, or indirectly through a larger provider network (not shown), to service gateway 160. In some embodiments, service gateway 160 includes a cluster of nodes that are used to balance the load of providing access to Internet 102b from sub-network 102a and to provide reliability through redundancy.

The AAA server 114, such as a Remote Authentication Dial In User Service (RADIUS) server, is used by service gateway 160 to verify a user of data packets received at gateway 160. In other embodiments other approaches are used to authenticate a user of a node with a given IP address; and thus map one with the other. For example, in various other embodiments, a database dip is used or Terminal Access Controller Access Control System (TACACS), TACACS+, Dynamic Host Configuration Protocol (DHCP), Bootstrap Protocol (BOOTP), or DIAMETER protocol is used.

The servers 170 provide various application layer (layer 7) resources desired by a user, such as web pages, data files, email, audio, video and gaming resources.

The URI database server 116 determines ratings for application layer resources available on servers 170, and is used by current filtering processes (not shown). Several commercial URI database servers are well known and widely used in commerce.

Ratings from URI databases server 116 describe application layer resources available on Internet 102b based on type of content. Each database server 116 uses multiple attributes to describe the types of content. Example attributes might include subject area attributes like history, science, religion, art, sports; media attributes like text, images, audio, video; and other attributes useful for filtering access, like sexual content, violence, and asocial behavior. Each resource, identified by its URI, is given a value for each of the attributes using sophisticated and sometime proprietary algorithms. The set of values for the corresponding attributes is called the rating of the application layer resource. A filtering process uses a URI database client to request from the URI database server the rating of a resource identified by its URI.

Although FIG. 1 depicts a particular number and type of networks 102a, 102b, end nodes 120, gateway 160 and servers 170 for purposes of illustration, in other embodiments a network includes the same, more or fewer end nodes and servers and the same or more service gateways 160 and other gateways.

In a common approach to URI filtering, an end node is configured to filter access to application layer resource based on a category of user, a blacklist of forbidden URIs and a white list of permitted URIs.

A category of user is a set of acceptable values for the set of attributes used to rate application layer resources by the URI database server 116. In some embodiments, several categories are configured. For example, on end nodes configured in a home, a filter process provides categories that reflect maturity levels of a user, such as child, pre-teen, teen, young adult and adult.

For purposes of illustration, it is assumed that two categories of users are configured on an end node in a high technology enterprise sub-network 102a: a human resources user (HR) category and an engineering user (ENG) category. It is further assumed that a URI database server rates each application layer resource on a scale from 0 (none) to 9 (highest) in the amount of content for each attribute, and that the attributes include technology, entertainment, news, shopping, jobs openings, sexual content, and violence. It is further assumed that the HR category and ENG category are defined by the acceptable ranges listed in Table 1.

TABLE 1

Example definitions of two categories of user on an enterprise network

| Attribute | HR category | ENG category |
| --- | --- | --- |
| technology | 5 to 9 | 5 to 9 |
| entertainment | 0 | 0 |
| news | 0-9 | 0-9 |
| shopping | 0 | 0 |
| Job openings | 5-9 | 0 |
| Sexual content | 0 | 0 |
| violence | 0 to 5 | 0 to 5 |

The ranges listed in Table 1 are acceptable ranges, thus any website with any entertainment, shopping or sexual content is not allowed. The HR category user is allowed to view websites with job openings, to see what the competition is doing, but the ENG category user is not.

Thus, in a common approach, an end node is configured for a user in the HR category or the ENG category. For example, end node 120a is configured for a HR and end node 120b is configured for ENG. A URI, e.g., www.jobsRus.com, requested from end node 120a is first checked against the ratings for that URI from the URI database server 116. It is assumed that this URI exists in the URI database and has a rating of (7,0,0,0,9,0,0) for the seven attributes in the example ratings. A filter process on an end node determines that this rating is permitted by the HR category and so permits the request. When the same URI is requested from end node 120b, it is first checked against the ratings for that URI from the URI database server 116. A filter process on an end node determines that this rating (7,0,0,0,9,0,0) is not permitted by the ENG category and so blocks the request.

Particular resources that are permitted or forbidden regardless of their rating in the URI database are listed in the white list and blacklist, respectively at each node enforcing the filtering process. For purposes of illustration, it is assumed that engineers are allowed to shop for parts from a particular supplier, e.g., RAMmanufacuringCorp.com that has a rating of (9,0,1,5,1,0,0). This website would be blocked based on the ENG category, but is allowed by being listed explicitly in a white list associated with the ENG category. It is further assumed that engineers are not allowed new releases from an arch rival company at website www.EvilRival.com that has a rating of (8,0,4,0,0,0,0). This website would be allowed based on the ENG category, but is blocked by being listed explicitly in a blacklist associated with the ENG category.

Thus, in this approach, each end node is configured with a category or a white list or a blacklist, or some combination, to describe every known application layer resource to which the user of the end node is allowed access. However, this is based on end nodes and not a user of the end node. Thus if an engineer logged onto end node 120a in the office of a member of human resources, that engineer is able to access the jobs websites.

In another approach, an intermediate network node is configured to enforce this filtering. In this approach, traffic from all network addresses associated with human resources department are filtered using the HR category and associated white list and blacklist. Traffic from all network addresses associated with the engineering department is filtered using the ENG category and associated white list and blacklist. However, this is based on IP addresses and not a user of a node with an IP address. Thus if an engineer signed onto end node 120a in the office of a member of human resources, that engineer is still able to access the jobs websites.

According to an illustrated embodiment, service gateway 160 includes an URI filter process 150 that is sensitive to users of end nodes 120. In the illustrated embodiment, URI filter process 150 includes a categories data structure 153 and a user cache data structure 155 (also called herein user cache 155) that describes the resources to which a user is allowed access. The data in user cache data 155 is obtained from a user profile data structure available to the service gateway 160, such as user URI profile data structure 152 on AAA server 114. This approach is described in more detail in the following sections.

Figure 1B:
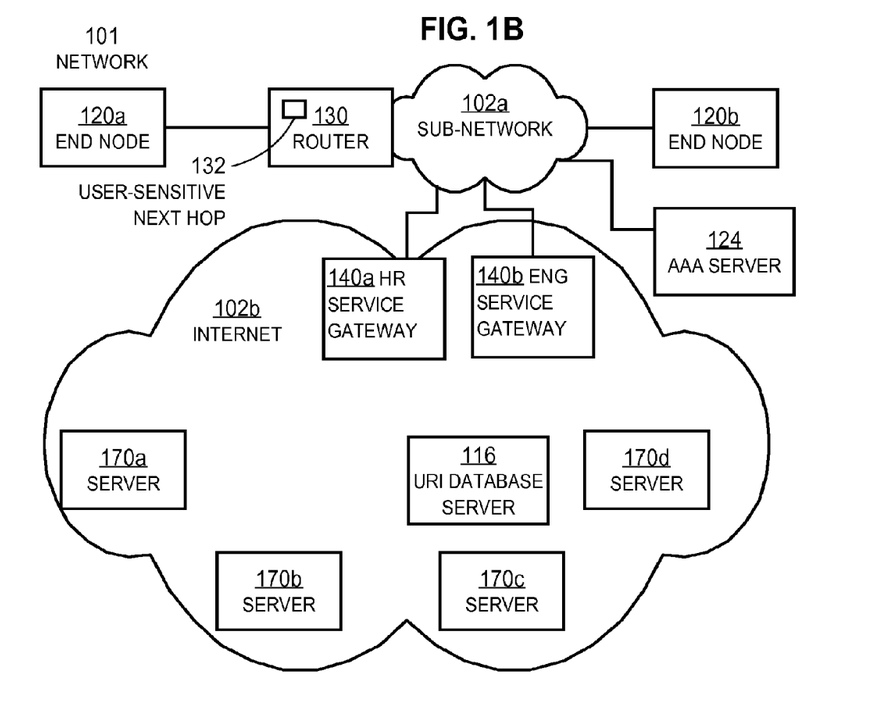
FIG. 1B illustrates a second example network.

A different approach to user-sensitive URI filtering in shown FIG. 1B. FIG. 1B illustrates a second example network 101. Network 101 includes end nodes 120, sub-network 102a and Internet 102b, as depicted in FIG. 1A. Internet 102b includes other servers 170 and URI database server 116, as described in FIG. 1A. However, in FIG. 1B, the service gateway 160 (or cluster of service gateways) is replaced by a first gateway 140a for one category of user (e.g., HR category) and a second gateway 140b for a different category of users (e.g., ENG category).

When a user of an end node signs on to the sub-network 102a, the intermediate network node on the edge of the sub-network (e.g., router 130) participates in authorizing the user. For example, an authentication process (not shown) on router 130 requests a user identifier (ID) and password from a user of end node 120a. The response is checked against information in an AAA server 124 on sub-network 102a. If successful, the user is granted access to sub-network 102a.

In this approach, routing information that indicates a next hop is associated with each user ID in a user-sensitive next hop process 132. When the user successfully signs on, traffic directed to the Internet 102b from the network address of the end node (e.g., 120a) where the user is signed on is directed to the next hop associated with the user. An Internet Protocol version 4 (IPv4) address is a layer 3 network address that is composed of four octets (an octet is 8 binary digits, bits). Each octet represents decimal numbers in the range from 0 to 255. It is customary to express an IPv4 address as four decimal numbers in the range from 0 to 255 separated by dots.

It is assumed for purposes of illustration that HR service gateway 140a has an IPv4 address of 10.10.10.10 and ENG service gateway 140b has an IPv4 address of 10.20.20.20. It is further assumed that end node 120a has an IPv4 address of 1.1.1.1 and end node 120b has an IPv4 address of 1.1.1.2. Thus, when Alice, an engineer, signs on to end node 120a, information associated with her user ID is retrieved (e.g., from AAA server 124) which indicates her Internet traffic should be forwarded to IP address 10.20.20.20. Thus user-sensitive next hop process 132 associates traffic from IP address 1.1.1.1 to the Internet 102b is to be forwarded to IP address 10.20.20.20. In some embodiments, router 130 propagates this routing information throughout sub-network 102a. Thus the engineering category and associated white list and blacklist are applied by service gateway 140b to traffic from end node 120a.

Although, this approach is user-sensitive and works even when Alice signs on to end node 120b, or if Alice moves to human resources, it is still only able to deal with categories of users. The approach does not provide for a white list or blacklist of Alice that is different from those of another engineer, e.g., Bob. Also, the approach requires substantial equipment expenditures in having a different service gateway node for each category to be supported, and thus limits the number of categories that can be supported. Furthermore, the approach involves multiple requests to URI database server 116 for popular resources. A popular resource is likely to be accessed by members of both HR and ENG categories. Thus the ratings of the popular resources must be requested by both HR service gateway 140*a* and ENG service gateway 140*b*. This doubles the traffic in Internet 102*b* and the load on URI database server 116. The waste is greater the more categories have devoted gateways in this approach.

3.0 Data Structures for User-Sensitive Filtering

Figure 2:
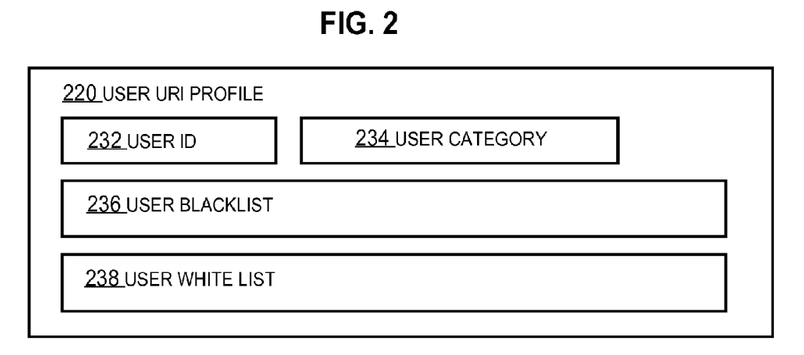
FIG. 2 illustrates an example data structure that includes a user profile for application layer resources.

FIG. 2 illustrates an example data structure 220 that includes a user profile for application layer resources. The user profile data structure 220 includes a user ID field 232, user category field 234, user blacklist filed 236 and user white list field 238. The user ID field holds data that indicates a user ID for a particular user. For purposes of illustration, it is assumed that users of sub-network 102*a* include Alice and Bob in the engineering department with user IDs Alice123@EnterpriseXYZ.com, and Robert456@EnterpriseXYZ.com, respectively, and Charles in the human resource department with user ID Charles789@EnterpriseXYZ.com. In an illustrated embodiment, the user ID field 232 holds data that indicates one of these user IDs of the particular user whose profile is contained in a particular user URI profile data structure 220. The data structure 220 is repeated for every user who is authorized to access sub-network 102*a*.

The user category field 234 (also called simply the category field 234, hereinafter) holds data that indicates the category of user, such as HR for the human resources category of user and ENG for the engineering category of user, for the particular user whose profile is contained in a particular user URI profile data structure 220. In some embodiments, on user can belong to multiple categories an all are listed in user category field 234.

The user blacklist field 236 holds data that indicates the URIs of zero or more application layer resources that are forbidden for the particular user whose profile is contained in a particular user URI profile data structure 220, regardless of such resources allowed to the category indicated in category field 234 of the same data structure 220. Similarly, the user white list field 238 holds data that indicates the URIs of zero or more application layer resources that are allowed for the particular user whose profile is contained in a particular user URI profile data structure 220, regardless of such resources blocked for the category indicated in category field 234 of the same data structure 220.

Unlike categories, white lists and blacklists in previous approaches, the category, white list and blacklist combination in data structure 220 is user specific for any user in a sub-network. In various embodiments, different users in the same category have different white lists or blacklists or both.

Although data structure 220 and fields 232, 234, 236 and 238 are depicted as contiguous portions of storage in a particular order for purposes of illustration, in other embodiments, one or more portions of data structure 220 and fields 232, 234, 236 and 238 are provided in separate areas of storage on one or more nodes and in a different order, for example in one or more linked lists.

The user URI profile data structure 220 for each user is stored so as to be accessible to a router (e.g., service gateway 160) that is to enforce the filtering. In some embodiments, the user URI profile data structure is stored under the control of the gateway router that is to enforce the filtering. In the illustrated embodiment, the user URI profile data structure 220 is stored on an AAA server (such as user URI profile 152 on AAA server 114) that stores other information about the user, such as a password used for authentication and services to which the user has subscribed.

Figure 3A:
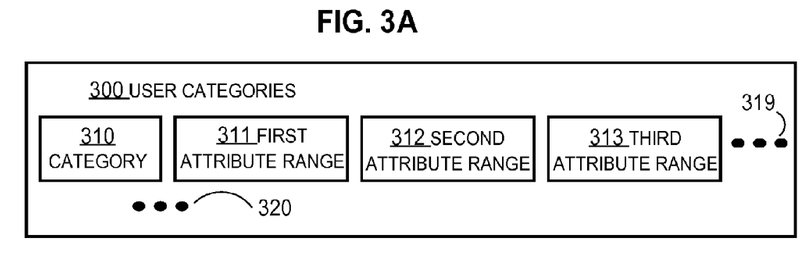
FIG. 3A illustrates an example data structure that includes a definition of a user category.

FIG. 3A illustrates an example data structure 300 that includes a definition of a user category. Data structure 300 holds information used to define the user categories, such as listed in Table 1, described above. The information in user categories data structure 300 is used to define a category in terms of acceptable ranges of attribute values given in ratings of an application layer resource.

The data structure 300 includes a category field 310; and associated with the category field 310 is a first attribute range field 311, a second attribute range field 312, a third attribute range field 313, and others indicated by ellipsis 319. Other category fields and associated attribute range fields are indicated by ellipsis 320.

The category field 310 holds data that indicates one of the categories of users defined for the filtering system, such as HR or ENG, for human resources category of users and engineering department category of users, respectively. The first attribute range field 311 holds data that indicates an acceptable range of values for a first attribute for the category indicated in the rating category field 310. For example, first attribute range 311 holds data that indicates the range 5 to 9 for the technology attribute. The second attribute range field 312 holds data that indicates an acceptable range of values for a second attribute for the category indicated in the category field 310. For example, second attribute range 312 holds data that indicates the range 0 to 0 for the entertainment attribute. Similarly, the third attribute range field 313, and others indicated by ellipsis, 319, holds data that indicates an acceptable range of values for a third attribute, and others, for the category indicated in the category field 310.

The user categories data structure 300 is stored so as to be accessible to a router (e.g., service gateway 160) that is to enforce the filtering. In the illustrated embodiment, the user categories data structure 300 is stored under the control of the router that is to enforce the filtering (e.g., as categories data structure 153 in the URI filter process 150 on service gateway 160).

Figure 3B:
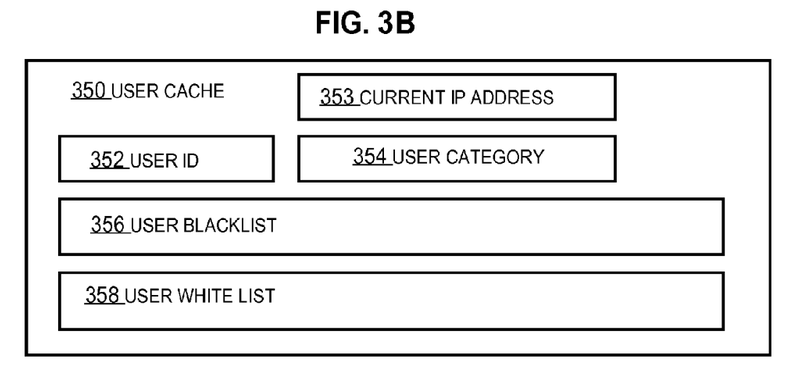
FIG. 3B illustrates an example data structure that includes information for a user cache.

FIG. 3B illustrates an example data structure 350 that includes information for a user cache. The data structure 350 includes a user ID field 352, a current. IP address field 353, a user category field 354, a user blacklist 356 and a user white list 358.

The user ID field 352 holds data that indicates the user ID of a user who has successfully signed on. For example, after Alice successfully signs onto end node 120*a* of sub-network 102*a*, the user ID field holds data that indicates Alice123@EnterpriseXYZ.com. The current. IP address field 353 holds data that indicates a current IP address of the end node where the user has successfully signed on, such as the IP address 1.1.1.1 of end node 120*a* where Alice signs on to sub-network 102*a*. The user category field 354, user blacklist field 356, and user white list field 358, hold data that is retrieved from user category field 234, user blacklist field 236, and user white list field 238, respectively, of the user URI profile of the user indicated in the user ID field 352.

The user cache data structure 350 is stored so as to be accessible to a router (e.g., service gateway 160) that is to enforce the filtering. In the illustrated embodiment, the user cache data structure 350 is stored under the control of the gateway router that is to enforce the filtering (e.g., as user cache data structure 155 in the URI filter process 150 on service gateway 160).

The data in the user cache can be obtained for any user on an end node that passes its Internet traffic through a particular node, and thus is suitable for all gateway routers.

Figure 4:
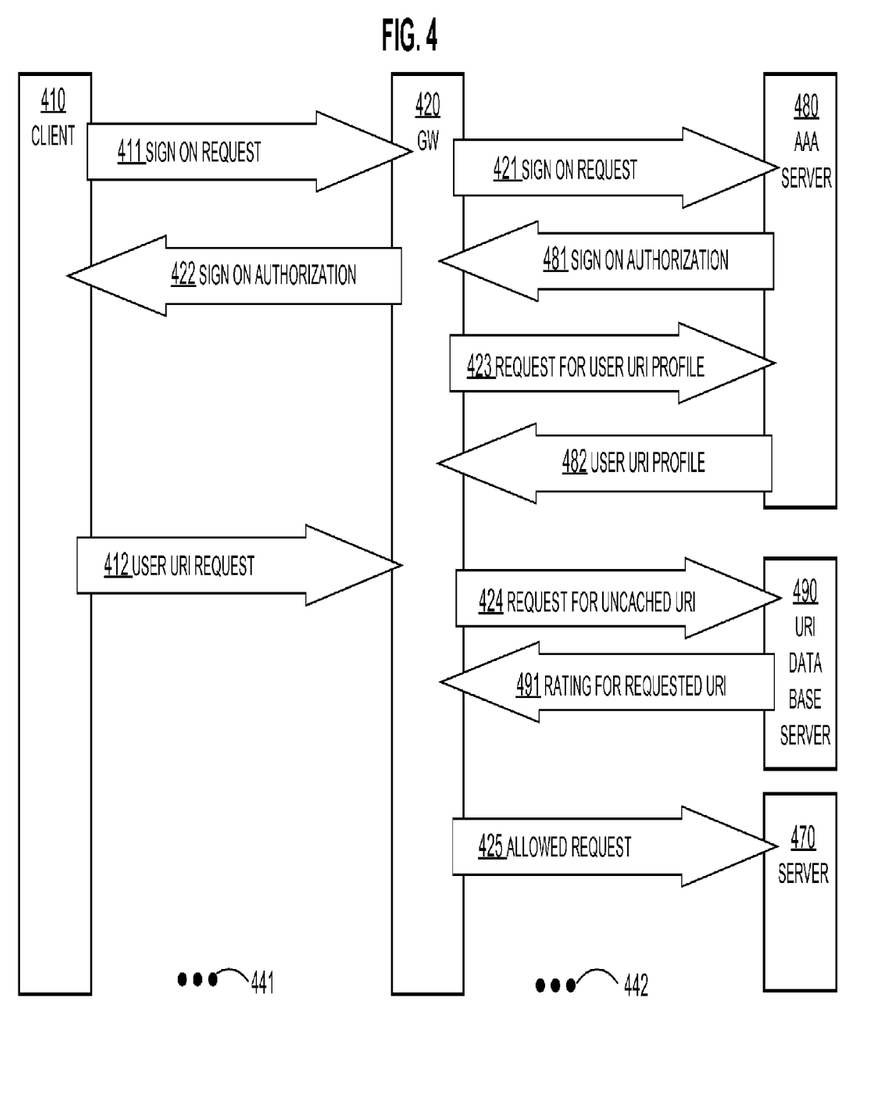
FIG. 4 illustrates an example time sequence of messages that filter application layer resources based on a user identifier.

FIG. 4 illustrates an example time sequence of messages that filter application layer resources based on a user identifier. FIG. 4 is a time sequence diagram that illustrates a sequence of IP data packets exchanged when a user signs onto subnetwork 102a. Time increases downward in FIG. 4. At a particular time an IP data packet is exchanged between a particular end node 410 (e.g., end node 120a) and a particular gateway router 420 (e.g., service gateway 160) or between the gateway router 420 and another server. The other servers include an AAA server 480 (e.g., AAA server 114 in Internet 102b), a URI database server 490 (e.g., URI database server 116 in Internet 102b), and another server 470 (e.g., server 170c in Internet 102b). The communicating nodes are represented by vertical blocks. A data packet is represented by a horizontal block; and direction of propagation of the data packet is indicated by an arrowhead on the block representing the data packet. Although a particular number of data packets are shown for purposes of illustration, in other embodiments more or fewer data packets are exchanged between end node 410 and gateway 420 and servers.

Figure 5:
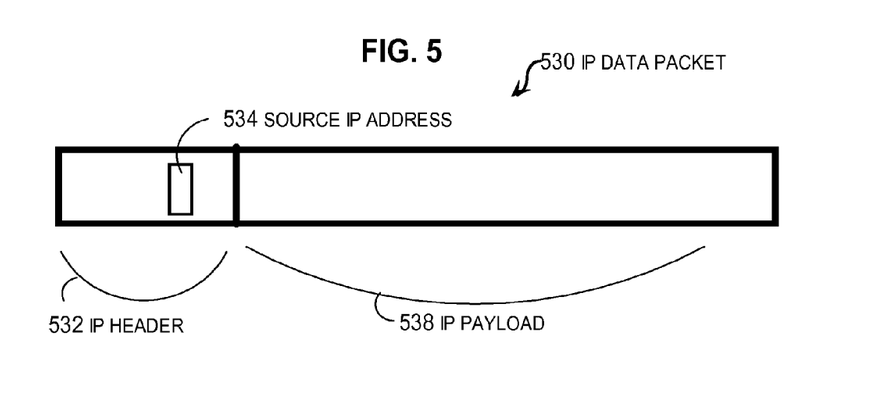
FIG. 5 illustrates an example Internet Protocol datagram with a request for an application layer resource.

FIG. 5 illustrates an example Internet Protocol (IP) datagram 530 with a request for an application layer resource. The IP datagram 530 includes an IP header 532 and an IP payload 538. The IP header 532 includes a source IP address field 534. The source IP address field 244 holds data that indicates an IP address of a node that originated the contents of the IP payload 538. For example, in IP datagrams from end node 120a, with IP address 1.1.1.1, the source IP address field 534 holds data that indicates the IP address 1.1.1.1. In a sign on request, the IP payload 538 includes data that indicates the user ID and authentication proof, such as a password or digital signature. In a request for an application layer resource, the IP payload 538 includes the request and the URI of the resource being requested.

Referring again to FIG. 4, at an earliest depicted time, an IP data packet 411 with a sign on request is sent from end node 410 and is routed to gateway router 420. The data packet 411 includes a user ID and authentication proof, such as a password or digital signature, either unsolicited or in response to a prompt from a sign on process. The gateway router 402 learns the user ID from the IP payload 358 and the end node IP address, where the user is signing on, from the source IP address field 354. The user ID and end node IP address are associated in a user cache data structure 350 (e.g., 155 on gateway 160). The gateway router 420 forwards the request to AAA server 480 in IP data packet 421. The AAA server verifies the authentication proof and sends a sign on authorization in IP data packet 481 sent back to gateway router 420. Gateway router 420 uses the authorization message in IP data packet 481 to fix or remove the association of user ID and IP address in user cache 350. In other embodiments, other authentication protocols are used. If the authorization message in IP data packet 481 indicates the sign on is unsuccessful, the gateway router 420 removes the association. If the authorization message in IP data packet 481 indicates the sign on is successful, the gateway router 420 maintains the association. In some embodiments, the association of user ID and IP address is not stored at all, until a successful authorization message is received in IP data packet 481 from AAA server 480. Gateway router 420 forwards the authorization message to end node 410 in IP data packet 422.

Immediately thereafter, in the illustrated embodiment, the gateway router 420 sends a request for the user URI profile to the AAA server in IP data packet 423. The request includes the user ID in the IP payload. In response to receiving the request for the user URI profile in IP data packet 423, the AAA server retrieves from user URI profile data structure 220 (e.g., in user URI profile 152 on AAA server 114), the user URI profile for the user indicated in the request IP data packet 423. The AAA server 480 sends the retrieved user URI profile to gateway router 420 in IP data packet 482. The gateway router 420 saves the user URI profile, in association with the IP address where the user is signed on, in user cache 350 (e.g., user cache 155 on service gateway 160). Thus, even before getting a first request for an application layer resource from an end node, the gateway router 420 is already prepared to filter such requests according to a user specific category, blacklist and white list for the user signed on to the end node. Thus the user does not have to wait for this retrieval of user profile data when the first URI request message is sent. In embodiments in which the gateway router 420 involves a cluster of routers for load balancing and redundancy, the user cache is replicated on all routers in the cluster that might receive resource requests from that end node.

In some embodiments, upon successful authorization of the sign on request received in IP data packet 421, the AAA server includes the user URI profile in the sign on authorization IP data packet 481, and IP data packets 423 and 482 are omitted.

In other embodiments, in which the user URI profile is maintained on a different node, the data packet 423 is sent to the different node and IP data packet 482 is sent in response from that different node. In some embodiments, data packet 422 is delayed until the exchange of data packet 423 and data packet 482 is complete.

At a later time, a request for a resource is sent from end node 410 in IP data packet 412. The request in the IP payload of IP data packet 412 includes a URI to identify the application layer resource being requested. This request is routed to gateway router 420. The source IP address of the request is used to identify the associated user cache. The URI in the request is checked against the blacklist in the associated user cache. If listed, the request is blocked. If not, the URI in the request is checked against the white list in the associated user cache. If listed there, the request is allowed, and the allowed request is forwarded to the server for that URI in IP data packet 425 to server 470.

If the URI in the request is not in the white list either, then the URI in the request is checked against the category of user in the associated user cache. This includes getting the rating of the URI of the requested resource. If that rating has already been retrieved and is in cache (not shown) on the local gateway router, then that rating is compared against the acceptable values that define the category. If not in the local cache, then the URI of the requested resource is sent in IP data packet 424 to the URI database server 490 (e.g., URI database server 116 in Internet 102b). In response, the URI database server retrieves the rating for the URI of the requested resource. The rating of the URI of the requested resource is sent to the gateway router 420 in IP data packet 491. That rating is compared against the acceptable values that define the category. If the rating does not match the acceptable values, then the request is blocked. If the rating does match, then the request is allowed, and the allowed request is forwarded to the server for that URI in IP data packet 425 to server 470.

Thus user-specific URI filtering is accomplished quickly and easily on one gateway (or gateway cluster) for all users authorized to sign onto sub-network 102a.

When the user signs off, the user cache associated with that user ID is marked obsolete; and is eventually purged from the gateway router 420, or overwritten, using standard cache management techniques.

Additional requests and sign off and sign on data packets are indicated by ellipsis 441. Additional AAA data packets, URI database request data packets and forwarding of allowed requests data packets are indicated by ellipsis 442.

4.0 Method for User-Sensitive Filtering

Figure 6:
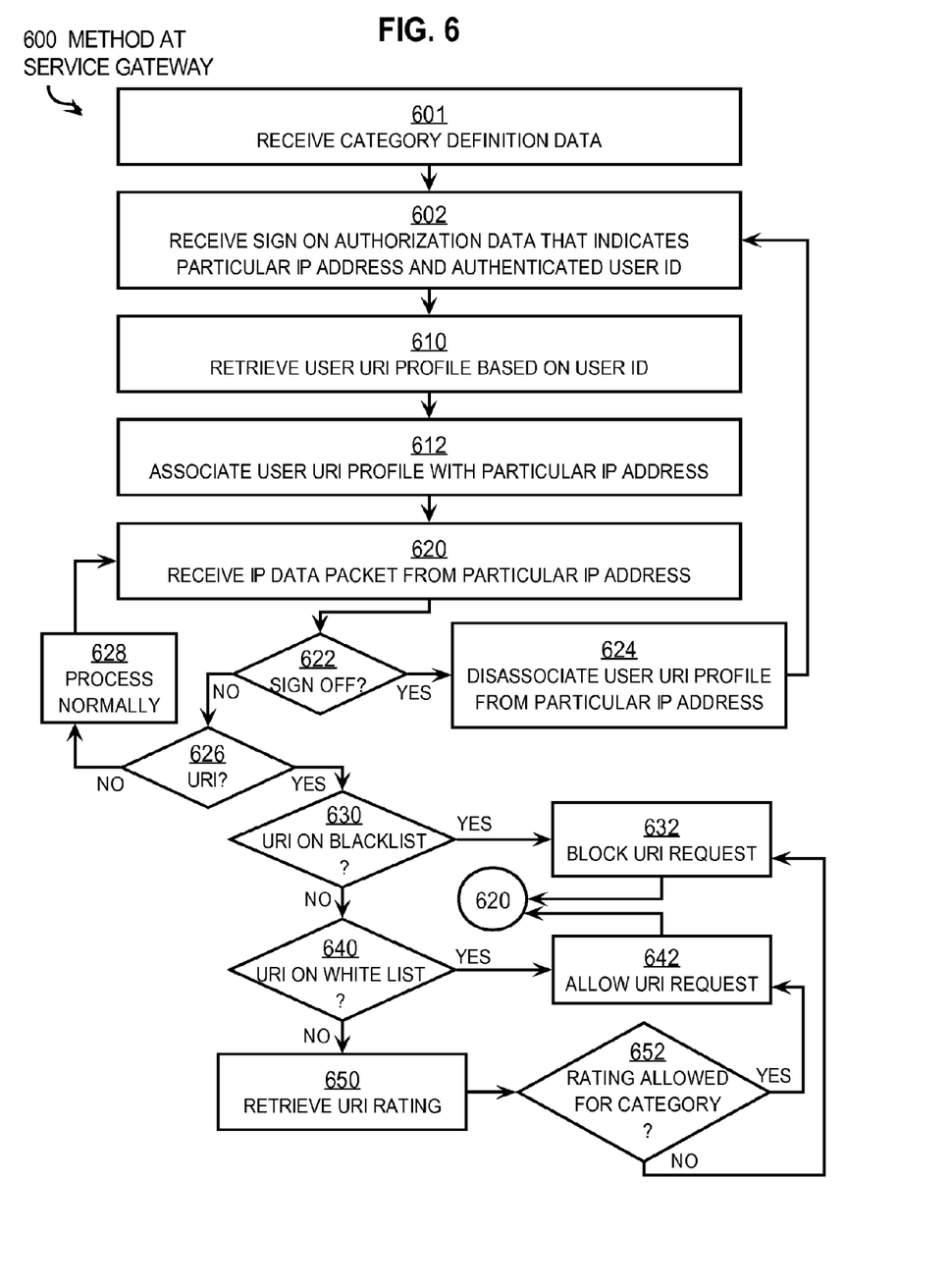
FIG. 6 illustrates, at a high level, a method at an intermediate network node for user-sensitive filtering of requests for application layer resources.

FIG. 6 illustrates, at a high level, a method 600 at an intermediate network node for user-sensitive filtering of requests for application layer resources. Although steps in FIG. 6 and any subsequent flow charts, are show in a particular order for purposes of illustration, in other embodiments, one or more steps may be performed in a different order or overlapping in time, in series or in parallel, or one or more steps may be omitted or added, or changed in some combination of ways.

In step 601, category definition data is received and stored in a rating categories data structure 300. Any method may be used to receive this data. For example, in various embodiments, the data is included as a default value in software instructions, is received as manual input from a network administrator on the local or a remote node, is retrieved from a local file or database, or is sent from a different node on the network, either in response to a query or unsolicited, or the data is received using some combination of these methods. In an illustrated embodiment, categories data is received and stored as categories data structure 153 in URI filter process 150 on service gateway 160. For purposes of illustration, it is assumed that the contents of categories data structure are as listed in Table 1 for a HR category and an ENG category.

In step 602, sign on authorization data is received. The sign on authorization data indicates a particular IP address and a user ID authenticated by password or signature or some other means. Any method may be used to receive this data. In some embodiments, the sign on authorization data is received in IP data packet 481 received from AAA server 124 in sub-network 102a. In an illustrated embodiment, the sign on authorization data is received in IP data packet 481 received from AAA server 114 in Internet 102b. For purposes of illustration, it is assumed that the authorization data indicates that the particular user with user ID Alice123.EnterpriseXYZ.com has been authorized to use sub-network 102a at IP address 1.1.1.1.

In step 610, user URI profile data is retrieved based on the user ID. For example, in various embodiments, the URI profile in data structure 220 is retrieved from a local file on gateway router 420, is retrieved based on a request message sent to a remote database or to AAA server 480, such as a RADIUS server. In some embodiments the URI profile data is retrieved from an authorization message, such as IP data packet 481 received from an AAA server 480. In an illustrated embodiment, the URI profile in data structure 152 on AAA server 114 is retrieved based on a request message sent from service gateway 160 to AAA server 114. For purposes of illustration, it is assumed that the user URI profile data indicates that the particular user with user ID Alice123.EnterpriseXYZ.com belongs to category ENG, with a blacklist that includes URI EvilRival.com and a white list that includes URI RAMmanufacturingCorp.com.

In step 612, the user URI profile is associated with the particular IP address in user cache 350. In the illustrated embodiment, the data from the URI profile for the particular user is associated with the IP address in user cache 155 on service gateway 160. Thus, in user cache 155 in URI filter process 150 on service gateway 160, IP address 1.1.1.1 is associated with category ENG, with a blacklist that includes URI EvilRival.com and a white list that includes URI RAMmanufacturingCorp.com.

In step 620, an IP data packet is received from the particular IP address. For purposes of illustration, it is assumed that the IP data packet indicates a source IP address of 1.1.1.1.

In step 622, it is determined whether the IP data packet indicates the user has signed off. If so, control passes to step 624. In step 624, the user URI profile is disassociated from the particular IP address. For example, the portion of user cache 155 with IP address 1.1.1.1 is marked obsolete, and available for overwriting. Control then passes back to step 602 to await another (or the same) user to sign on to the end node with the particular IP address. For example, the process pauses until another user signs on to end node 120a that has IP address 1.1.1.1. In the meantime, the process continues for users signed on to other end nodes in the sub-network 102a.

If it is determined, in step 622, that the IP data packet does not indicate the user has signed off, then control passes to step 626. In step 626, it is determined whether the IP data packet is a request for a resource that specifies a URI. If not, control passes to step 628 to process the data packet normally based on the appropriate protocols. Control passes back to step 620 to receive the next IP data packet.

If it is determined, in step 626, that the IP data packet is a request for a resource that specifies a URI, then control passes to step 630. In step 630 it is determined whether the URI is on the blacklist associated with the particular IP address. If so, control passes to step 632 to block the request. In some embodiments, step 632 includes sending a message back the particular IP address that indicates the request has been blocked. Control passes back to step 620 to receive the next IP data packet. For example, it is determined if the URI includes EvilRival on the blacklist for IP address 1.1.1.1 in user cache 155. For purposes of illustration, it is assumed that the URI does not include the EvilRival.

If it is determined, in step 630, that the URI is not on the blacklist associated with the particular IP address, then control passes to step 640. In step 640 it is determined whether the URI is on the white list associated with the particular IP address. If so, control passes to step 642 to allow the request and forward the request to the server on the Internet. Control passes back to step 620 to receive the next IP data packet. For example, it is determined if the URI includes RAMmanufacturingCorp.com on the white list for IP address 1.1.1.1 in user cache 155. For purposes of illustration, it is assumed that the URI does not include RAMmanufacturingCorp.com.

If it is determined, in step 640, that the URI is not on the white list associated with the particular IP address, then control passes to step 650. In step 650 the rating for the requested URI is retrieved. Step 650 includes searching local cache, if any, for the rating; and sending a request to URI database only if the requested URI rating is not in the local cache. Control then passes to step 652. For purposes of illustration, it is assumed that the requested URI is TechUchange.com and that its rating is (8,0,8,0,8,0,0).

In step 652, it is determined whether the rating is allowed for the category associated with the source IP address. If so, control passes to step 642, described above, to allow the request. If not, control passes to step 632, described above, to block the request. For example, it is determined that the rating (8,0,8,0,8,0,0) is not allowed because it includes an 8 in the job openings attribute and the allowed value is zero for the ENG category. Control passes to step 632 to block the request.

Using the method 600, any intermediate network node through which sign on and application layer resource requests are passed is able to perform user-sensitive filtering of those resource requests. This method is especially suitable for gateway routers. The method 600 dynamically pre-provisions a white list/blacklist/category on a per-subscriber basis at subscriber sign-on, and dynamically updates a category's effect based on a commercially available URI database. This method covers a gap in current URI filtering solutions to dynamically pre-provision specified URIs on a content filtering engine at user-sign on. Per-category white lists are provisioned when the first user of that category signs on. An advantage of retrieving the user's profile at sign on, rather than first request, is that the user perceives less delay between the time of making the request and passing the filter. The filter already knows of the user and does not have to retrieve the user profile after getting the first URI request from the user. In addition, a single user may be a member of more than one category, and therefore leverage multiple white lists./blacklists simultaneously.

Furthermore, because a single intermediate node serves many users on many end nodes, when a popular resource is repeatedly requested by multiple users, no matter what category, the rating for that resource is likely already in local cache, thus saving frequent requests to the URI database server. Thus, URI ratings in local cache are dynamically updated to include most-visited URIs.

5.0 Implementation Mechanisms—Hardware Overview

Figure 7:
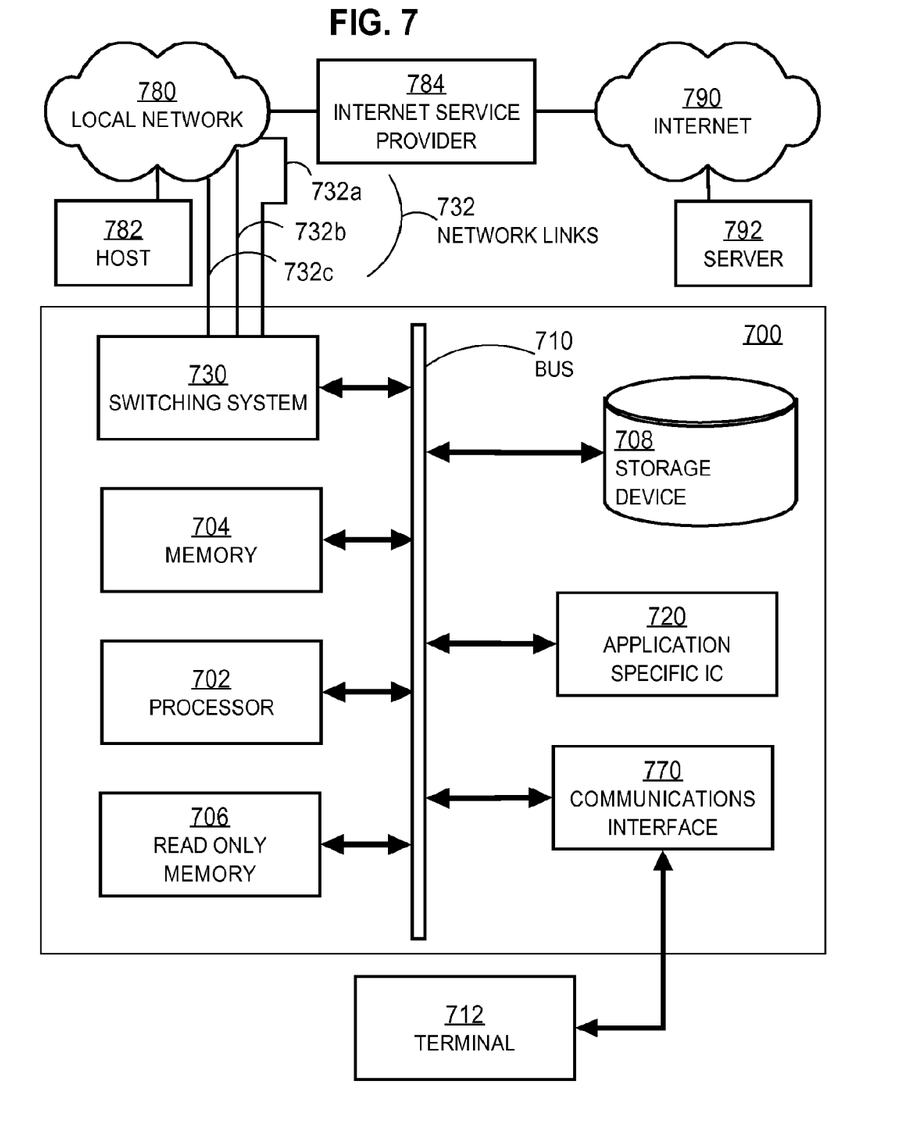
FIG. 7 illustrates a computer system upon which an embodiment of the invention may be implemented.

FIG. 7 illustrates a computer system 700 upon which an embodiment of the invention may be implemented. The preferred embodiment is implemented using one or more computer programs running on a network element such as a router device. Thus, in this embodiment, the computer system 700 is a router.

Computer system 700 includes a communication mechanism such as a bus 710 for passing information between other internal and external components of the computer system 700. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 710 includes many parallel conductors of information so that information is transferred quickly among devices coupled to the bus 710. One or more processors 702 for processing information are coupled with the bus 710. A processor 702 performs a set of operations on information. The set of operations include bringing information in from the bus 710 and placing information on the bus 710. The set of operations also typically include comparing two or more units of information, shifting positions of units of information, and combining two or more units of information, such as by addition or multiplication. A sequence of operations to be executed by the processor 702 constitute computer instructions.

Computer system 700 also includes a memory 704 coupled to bus 710. The memory 704, such as a random access memory (RAM) or other dynamic storage device, stores information including computer instructions. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of computer instructions. The computer system 700 also includes a read only memory (ROM) 706 or other static storage device coupled to the bus 710 for storing static information, including instructions, that is not changed by the computer system 700. Also coupled to bus 710 is a non-volatile (persistent) storage device 708, such as a magnetic disk or optical disk, for storing information, including instructions, that persists even when the computer system 700 is turned off or otherwise loses power.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 710 for use by the processor from an external terminal 712, such as a terminal with a keyboard containing alphanumeric keys operated by a human user, or a sensor. A sensor detects conditions in its vicinity and transforms those detections into signals compatible with the signals used to represent information in computer system 700. Other external components of terminal 712 coupled to bus 710, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 712. In some embodiments, terminal 712 is omitted.

Computer system 700 also includes one or more instances of a communications interface 770 coupled to bus 710. Communication interface 770 provides a two-way communication coupling to a variety of external devices that operate with their own processors, such as printers, scanners, external disks, and terminal 712. Firmware or software running in the computer system 700 provides a terminal interface or character-based command interface so that external commands can be given to the computer system. For example, communication interface 770 may be a parallel port or a serial port such as an RS-232 or RS-422 interface, or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 720, is coupled to bus 710. The special purpose hardware is configured to perform operations not performed by processor 702 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware. Logic encoded in one or more tangible media includes one or both of computer instructions and special purpose hardware.

In the illustrated computer used as a router, the computer system 700 includes switching system 730 as special purpose hardware for switching information for flow over a network. Switching system 730 typically includes multiple communications interfaces, such as communications interface 770, for coupling to multiple other devices. In general, each coupling is with a network link 732 that is connected to another device in or attached to a network, such as local network 780 in the illustrated embodiment, to which a variety of external devices with their own processors are connected. In some embodiments an input interface or an output interface or both are linked to each of one or more external network elements. Although three network links 732a, 732b, 732c are included in network links 732 in the illustrated embodiment, in other embodiments, more or fewer links are connected to switching system 730. Network links 732 typically provides information communication through one or more networks to other devices that use or process the information. For example, network link 732b may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790. A computer called a server 792 connected to the Internet provides a service in response to information received over the Internet. For example, server 792 provides routing information for use with switching system 730.

The switching system 730 includes logic and circuitry configured to perform switching functions associated with passing information among elements of network 780, including passing information received along one network link, e.g. 732a, as output on the same or different network link, e.g., 732c. The switching system 730 switches information traffic arriving on an input interface to an output interface according to pre-determined protocols and conventions that are well known. In some embodiments, switching system 730 includes its own processor and memory to perform some of the switching functions in software. In some embodiments, switching system 730 relies on processor 702, memory 704, ROM 706, storage 708, or some combination, to perform one or more switching functions in software. For example, switching system 730, in cooperation with processor 704 implementing a particular protocol, can determine a destination of a packet of data arriving on input interface on link 732a and send it to the correct destination using output interface on link 732c. The destinations may include host 782, server 792, other terminal devices connected to local network 780 or Internet 790, or other routing and switching devices in local network 780 or Internet 790.

The invention is related to the use of computer system 700 for implementing the techniques described herein. According to one embodiment of the invention, those techniques are performed by computer system 700 in response to processor 702 executing one or more sequences of one or more instructions contained in memory 704. Such instructions, also called software and program code, may be read into memory 704 from another computer-readable medium such as storage device 708. Execution of the sequences of instructions contained in memory 704 causes processor 702 to perform the method steps described herein. In alternative embodiments, hardware, such as application specific integrated circuit 720 and circuits in switching system 730, may be used in place of or in combination with software to implement the invention. Thus, embodiments of the invention are not limited to any specific combination of hardware and software.

The signals transmitted over network link 732 and other networks through communications interfaces such as interface 770, which carry information to and from computer system 700, are example forms of carrier waves. Computer system 700 can send and receive information, including program code, through the networks 780, 790 among others, through network links 732 and communications interfaces such as interface 770. In an example using the Internet 790, a server 792 transmits program code for a particular application, requested by a message sent from computer 700, through Internet 790, ISP equipment 784, local network 780 and network link 732b through communications interface in switching system 730. The received code may be executed by processor 702 or switching system 730 as it is received, or may be stored in storage device 708 or other non-volatile storage for later execution, or both. In this manner, computer system 700 may obtain application program code in the form of a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to an infra-red signal, a carrier wave serving as the network link 732b. An infrared detector serving as communications interface in switching system 730 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702 or switching system 730.

6.0 Extensions And Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising:
receiving, at a local node of a network, authorization data that indicates a particular network address of a different node in the network and an authenticated user identifier (ID) of a user of the different node, wherein the user ID is associated with resource profile data that indicates application layer resources on the network that the user is allowed to access, and wherein the resource profile data includes a whitelist that is provisioned based on the user ID, the whitelist comprising a permitted list of identifiers of one or more application layer resources that the user is allowed to access regardless of the resource profile data, wherein each application layer resource is associated with a rating that comprises a plurality of values for a corresponding plurality of attributes that describe types of content of the application layer resource, wherein the resource profile data includes user category data associated with the user ID indicating a user category of the user, and wherein the user category determines an acceptable range of values for each of the plurality of attributes;
associating the particular network address with the resource profile data for the user; and
blocking a request from the particular network address for a requested application layer resource on the network based on the resource profile data associated with the particular network address.

2. The method of claim 1, blocking the request further comprising:
receiving a message that includes source address data that indicates the particular network address and resource request data that indicates the requested application layer resource;
determining, at the local node, whether access to the requested application layer resource is allowed based on the resource profile data associated with the particular network address; and
if it is determined that access to the requested application layer resource is not allowed, then blocking the message at the local node.

3. The method of claim 2, further comprising:
if it is determined that access to the requested application layer resource is allowed, forwarding the message to the requested application layer resource.

4. The method of claim 1, wherein each category of a plurality of categories is associated with a plurality of acceptable values corresponding to the plurality of attributes.

5. The method of claim 4, wherein blocking the request further comprises:
receiving particular rating data that indicates particular values for the plurality of attributes associated with the requested application layer resource; and
determining whether the particular values are consistent with a plurality of acceptable values corresponding to the plurality of attributes associated with a particular category.

6. The method of claim 1, wherein the resource profile data is retrieved subsequent to the user providing the user ID.

7. The method of claim 1, wherein the resource profile data is stored before the request is generated such that incoming requests from the particular network address can be filtered using a user cache.

8. The method of claim 1, wherein at least one of the identifiers of one or more application layer resources is a Uniform Resource Identifier (URI).

9. The method of claim 1, wherein the local node is a service gateway node.

10. One or more non-transitory tangible media that includes code for execution and when executed by a processor operable to perform operations comprising:
receiving, at a local node of a network, authorization data that indicates a particular network address of a different node in the network and an authenticated user identifier (ID) of a user of the different node, wherein the user ID is associated with resource profile data that indicates application layer resources on the network that the user is allowed to access, and wherein the resource profile data includes a whitelist that is provisioned based on the user ID, the whitelist comprising a permitted list of identifiers of one or more application layer resources that the user is allowed to access regardless of the resource profile data, wherein each application layer resource is associated with a rating that comprises a plurality of values for a corresponding plurality of attributes that describe types of content of the application layer resource, wherein the resource profile data includes user category data associated with the user ID indicating a user category of the user, and wherein the user category determines an acceptable range of values for each of the plurality of attributes;
associating the particular network address with the resource profile data for the user; and
blocking a request from the particular network address for a requested application layer resource on the network based on the resource profile data associated with the particular network address.

11. The media of claim 10, wherein blocking the request further comprises:
receiving a message that includes source address data that indicates the particular network address and resource request data that indicates the requested application layer resource;
determining whether access to the requested application layer resource is allowed based on the resource profile data associated with the particular network address; and
blocking the message if it is determined that access to the requested application layer resource is not allowed.

12. An apparatus, comprising:
a memory element configured to store data,
a processor operable to execute instructions associated with the data, and; and
logic encoded in the one or more tangible media and, when executed by the processor, being configured to:
receive, at a local node of a network, authorization data that indicates a particular network address of a different node in the network and an authenticated user identifier (ID) of a user of the different node, wherein the user ID is associated with resource profile data that indicates application layer resources on the network that the user is allowed to access, and wherein the resource profile data includes a whitelist that is provisioned based on the user ID, the whitelist comprising a permitted list of identifiers of one or more application layer resources that the user is allowed to access regardless of the resource profile data, wherein each application layer resource is associated with a rating that comprises a plurality of values for a corresponding plurality of attributes that describe types of content of the application layer resource, wherein the resource profile data includes user category data associated with the user ID indicating a user category of the user, and wherein the user category determines an acceptable range of values for each of the plurality of attributes;

associate the particular network address with the resource profile data for the user; and block a request from the particular network address for a requested application layer resource on the network based on the resource profile data associated with the particular network address.

13. The apparatus of claim 12, wherein the resource profile data includes a blacklist that is provisioned based on the user ID, the blacklist comprising a forbidden list of identifiers of one or more application layer resources that the user is not allowed to access regardless of the resource profile data.

14. The apparatus of claim 12, further comprising:

if it is determined that access to the requested application layer resource is allowed, then forwarding the message to the requested application layer resource.

15. The apparatus of claim 12, wherein each category of a plurality of categories is associated with a plurality of acceptable values corresponding to the plurality of attributes.

16. The apparatus of claim 15, wherein the blocking the request further comprises:

receiving particular rating data that indicates particular values for the plurality of attributes associated with the requested application layer resource; and determining whether the particular values are consistent with a plurality of acceptable values corresponding to the plurality of attributes associated with the particular category.

17. The apparatus of claim 12, wherein the resource profile data is retrieved subsequent to the user providing the user ID.

18. The apparatus of claim 12, wherein the resource profile data is stored before the request is generated such that incoming requests from the particular network address can be filtered using a user cache.

19. The apparatus of claim 12, wherein at least one of the identifiers of one or more application layer resources is a Uniform Resource Identifier (URI).

20. The apparatus of claim 12, wherein the apparatus is configured as a service gateway node.

* * * * *